18
United States Patent Office 3,501,511
Patented Mar. 17, 1970

3,501,511
ADAMANTYL SULFONAMIDE COMPOUNDS
Venkatachala L. Narayanan, North Brunswick, N.J., assignor to E. R. Squibb & Sons, Inc., New York, N.Y., a corporation of Delaware
No Drawing. Filed Aug. 21, 1967, Ser. No. 661,781
Int. Cl. C07c 143/80
U.S. Cl. 260—397.7                          10 Claims

ABSTRACT OF THE DISCLOSURE

This invention relates to new adamantyl sulfonamide compounds which are useful as antimicrobial agents.

---

This invention relates to new compounds of the formula

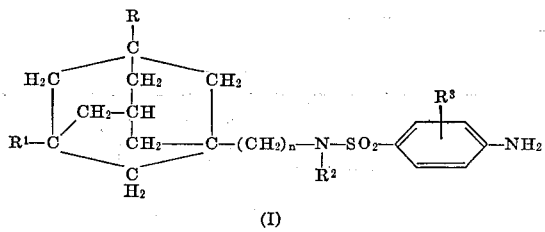

(I)

wherein R and $R^1$ each is hydrogen, halogen, lower alkyl, phenyl or phenyl-lower alkyl, $R^2$ is hydrogen or lower alkyl, $R^3$ is hydrogen, lower alkyl, lower alkoxy, halogen or halo-lower alkyl and $n$ is 0, 1 or 2, and salts thereof.

The lower alkyl groups include straight and branched chain aliphatic hydrocarbon radicals such as methyl, ethyl, propyl, isopropyl, butyl, s-butyl, t-butyl, amyl and the like. Similar radicals are included in the lower alkoxy, phenyl-lower alkyl and halo-lower alkyl groups. The halo-lower alkyl groups include such substituents as chloromethyl, bromomethyl, dichloroethyl, trifluoromethyl and the like. All four halogens are included but chloro and bromo are preferred as the individual halogens and trifluoromethyl is the preferred haloalkyl group.

The new compounds of Formula I are produced by condensing a compound of the formula

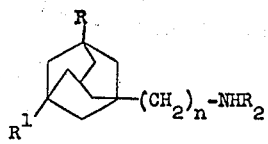

(II)

wherein R, $R^1$ and $R^2$ have the same meaning as in Formula I, with a p-aminobenzenesulfonyl halide of Formula III or a p-nitrobenzenesulfonyl halide of Formula IV.

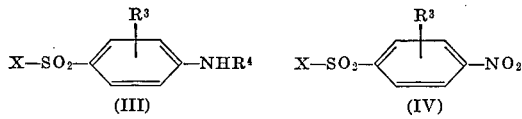

In Formulas III and IV, X is a halogen such as chlorine or bromine and in Formula III $R^4$ is a protecting group, such as acetyl, carbethoxy or carbobenzoxy, which can be converted to an amino group by hydrolysis. If the nitro compound of Formula IV is used, the nitro group is converted to the amino group, after the condensation reaction, by reduction. The condensation reaction is effected in the presence of an organic base such as pyridine or triethylamine.

The compounds of Formula I form acid addition salts with various inorganic and organic acids. Illustrative salts include the hydrohalides, e.g., hydrobromide, hydrochloride, hydroiodide, sulfate, nitrate, phosphate, borate, acetate, oxalate, tartrate, malate, citrate, succinate, benzoate, pamoate, ascorbate, salicylate, theophyllinate, camphorsulfonate, alkanesulfonate, e.g., methanesulfonate, arylsulfonate, e.g., benzenesulfonate, toluenesulfonate, etc. It is frequently convenient to effect the purification of the product by forming the acid salt. The free base may then be obtained therefrom by neutralization with an alkali hydroxide such as ammonium hydroxide.

When $R^2$ is hydrogen, the compounds of Formula I form basic salts, both inorganic and organic, e.g., salts such as alkali metal salts like sodium or potassium salts or alkanolamine salts like diethanolamine salts.

The starting amines of Formula II are prepared by reduction of the corresponding amide with lithium aluminum hydride or by the reaction of an N-alkylacylamide with halogenated adamantane, followed by hydrolysis to the N-alkyladamantaneamine. Alternatively, the group $R_2$ may be introduced after the condensation, by treating the product with an alkyl halide like methyl iodide and a base like sodium hydroxide.

The compounds of Formula III may be prepared by chlorosulphonation of the substituted N-protected amine or by treating the corresponding chlorosulphonic acid with phosphorus pentachloride.

The compounds of Formula IV may be prepared by chlorosulfonation of the substituted nitrobenzene or by treating the corresponding chlorosulfonic acid with phosphorus pentachloride.

The salts are prepared by treating a compound of Formula I with an acid, preferably a strong mineral acid, like HCl, HBr, $H_2SO_4$, at a temperature of about 50–80°.

The new compounds of this invention are useful as antimicrobial agents, e.g., as antiviral agents, for example, against influenza virus such as A–PR8 or hepatic virus such as $MHV_3$, or as antibacterial agents, for example, against Staphylococci or Diplococci. They may be used as antiseptics or disinfectants for control or elimination of airborne or environmental microbes, e.g., in sprays, aqueous solutions, emulsions or suspensions of up to about 10% concentration. They may also be used orally or parenterally to combat microbial infestation of such organisms in animal species affected by them by oral or parenteral administration of 5 to 40 mg./kg. three or four times daily of a compound of Formula I or a physiologically acceptable acid addition salt thereof (or basic salt when $R^2$ is hydrogen) in conventional dosage forms such as tablets, capsules, injectables or the like.

EXAMPLE 1

Preparation of $N^1$-(1-adamantyl)sulfanilamide

METHOD A (1) Preparation of N-(1-adamantyl)-p-nitrobenzenesulfonamide.—To a solution of 11.1 g. (0.05 mole) of p-nitrobenzenesulfonyl chloride in 150 ml. of anhydrous pyridine, a solution of 7.6 g. of 1-aminoadamantane in 100 ml. of pyridine is added at a slow rate. The mixture is then stirred overnight at room temperature. The solution is concentrated and poured onto ice water. The yellow solid that precipitates is collected (15 g.) and crystallized twice from dilute methanol to give 10.3 g. of the product as pale yellow crystals melting over 280°.

(2) Preparation of $N^1$-(1-adamantyl)sulfanilamide.—A solution of 3 g. of N-(1-adamantyl)-p-nitrobenzenesulfonamide dissolved in 200 ml. of absolute alcohol (warming) is reduced catalytically using 0.3 g. of platinum oxide. After the reduction is complete, the catalyst is filtered off and the solution is concentrated in vacuo. Upon dilution with 500 ml. of dry ether, 2.5 g. of the compound precipitates as a yellow powder. It is collected, and crystallized from a mixture of 200 ml. of methanol and 200 ml. of water to give 1.6 g. of $N^1$-(1-adamantyl)sulfanilamide as long yellow needles, M.P. 178–179°.

METHOD B (1) Preparation of 4'-(1-adamantylsulfamoyl)acetanilides.—A solution of 9.6 g. (0.06 mole) of 1-aminoadamantane and 13.9 g. (0.06 mole) of p-N-acetylsulfanilyl chloride in 300 ml. of anhydrous pyridine is stirred at room temperature overnight. At the end of the period, the reaction mixture is heated on a steam-bath for 0.25 hour. The mixture is poured into a well-cooled solution of 5 N hydrochloric acid. The solid that precipitates is collected, washed with ether and crystallized from dilute methyl alcohol to give 8.2 g. of pale yellow crystals, M.P. 211–213°.

(2) Preparation of $N^1$-(1-adamantyl)sulfanilamides.—A suspension of 1.0 g. of 4'-(1-adamantylsulfamoyl)acetanilide in 300 ml. of 5% sodium hydroxide solution is refluxed with stirring for 0.75 hour. The mixture is cooled in ice and made strongly acidic with 20% hydrochloric acid. The solution is filtered, cooled and basified with 10% sodium hydroxide solution. The product that separates is collected, and crystallized from methanol-water to give 210 mg. of needles; M.P. 176–178°, infrared identical to the material made by Method A.

Following the same procedures (Method A or B) but substituting an equivalent amount of the indicated aminochloride in the procedure of Example 1, the corresponding substituted sulfanilamide is obtained.

Example 7. $R_3=CH_3$
Example 8. $R_3=OC_2H_5$
Example 9. $R_3=CH_3$
Example 10. $R_3=C_2H_5$
Example 11. $R_3=Cl$

EXAMPLE 12

Preparation of $N^1$-(1-adamantylmethyl)sulfanilamide (1) Preparation of 1-adamantane carboxylic acid chloride.—To 18 g. of 1-adamantane carboxylic acid, 50 ml. of thionyl chloride is added with cooling, and the mixture is heated under reflux for 30 minutes. The excess of thionyl chloride is removed in vacuo. The addition of 2× 30 ml. of dry benzene (benzene dried over silica gel) and evaporation serve to remove the last traces. Anhydrous ether (30 ml.) is added and the solution is evaporated leaving 19.2 g. (92%) of 1-adamantanecarboxylic acid chloride as a brownish white solid.

(2) Preparation of 1-adamantanecarboxamide.—1-adamantanecarboxylic acid chloride (35 g.) dissolved in 70 ml. of dry tetrahydrofuran, is added to a well-cooled aqueous ammonia solution. A white precipitate appears and the mixture is then stirred for 0.5 hour. The precipitate is filtered, washed with water to neutrality and dried over phosphorus pentoxide in vacuo to give 30.1 g. of 1-adamantanecarboxamide; M.P. 186–187.5°.

(3) Preparation of 1-adamantylmethylamine.—To a well-stirred suspension of 30 g. of lithium aluminum hydride in 1000 ml. of dry ether, 27 g. (0.15 mole) of 1-adamantanecarboxamide is added in portions over a period of 1.5 hours. After the addition, the reaction mixture Aminoadamantane          $N^1$-Adamantyl sulfanilamide

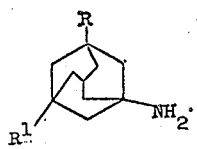 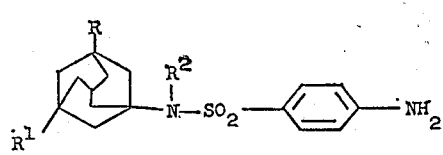

Example 2. R=H, $R_1=CH_3$, $R_2=H$
Example 3. R=$CH_3$, $R_1=CH_3$, $R_2=H$
Example 4. R=H, $R_1=H$, $R_2=CH_3$
Example 5. R=H, $R_1=H$, $R_2=C_2H_5$
Example 6. R=F, $R_1=OCH_3$, $R_2=H$ Similarly by substituting an equivalent amount of the indicated acetylsulfanilyl chloride or nitrobenzenesulfonyl chloride in the procedure of Example 1, the corresponding substituted sulfanilamide is obtained.

is stirred at room temperature for 1 hour, and then is refluxed with stirring for 4 hours, and finally is allowed to stand overnight at room temperature. The suspension is well-cooled and 50 ml. of water is added dropwise with vigorous stirring. This is followed by the addition of 100 ml. of 10% sodium hydroxide solution. The ethereal layer is separated and the solid is extracted three times with ether. The combined ethereal layer is dried ($MgSO_4$) and Acetylsulfonyl chloride      $N^1$-(1-adamantyl)sulfanilamide

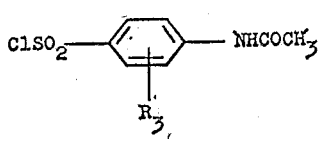 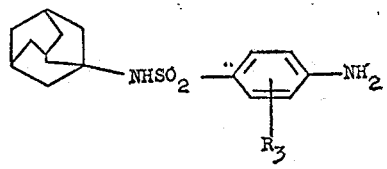

or

Nitrobenzenesulfonyl chloride

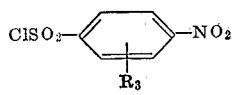

evaporated in vacuo to give 14.5 g. of 1-adamantylmethylamine as a pale yellow liquid.

(4) Preparation of $N^1$- (adamantylmethyl)sulfanilamide.—Following the procedure of Example 1 but substituting 1-adamantylmethylamine for the 1-aminoadamantane, there is obtained $N^1$-(1-adamantylmethyl)sulfanilamide.

Similarly by substituting the following adamantanecarboxylic acids for 1-adamantanecarboxylic acid, there is obtained the corresponding substituted $N^1$-(1-adamantylmethyl)sulfanilamides.

Adamantane carboxylic acid

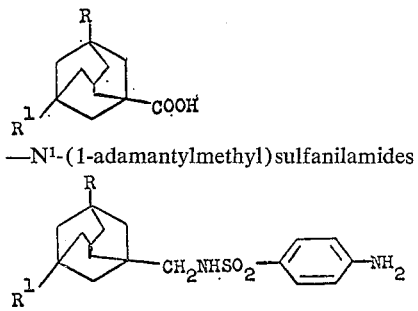

—$N^1$-(1-adamantylmethyl)sulfanilamides

Example 13. R=H, $R_1$=F
Example 14. R=H, $R_1$=$C_2H_5$
Example 15. R=H, $R_1$=Br
Example 16. R=$CH_3$, $R_1$=$CH_3$

EXAMPLE 17

Preparation of $N^1$-(1-adamantylethyl)sulfanilamide (1) Preparation of 1-adamantylacetic acid.—A solution of 25 g. of 1-bromoadamantane in 100 g. of dichloroethylene is added dropwise during 1.5 hours to 100 ml. of sulfuric acid (90%) containing 18 g. of boron trifluoride. The temperature is maintained between 8–10°. After stirring for 3 hours at 10°, crushed ice is gradually added, and the mixture diluted with water. The crude precipitate (26.5 g.) is dissolved in 10% sodium hydroxide solution, and the cloudy solution is extracted once with ether. The basic solution is cooled, and acidified with 5% hydrochloric acid. The 1-adamantaneacetic acid that precipitates is collected and dried to give 21.5 g. of white solid, M.P. 130–133°, the analytical sample crystallizes from methanol-water as long white needles; M.P. 134–136°.

(2) Preparation of 1-adamantaneacetic acid chloride is prepared similar to 1-adamantanecarboxylic acid chloride but using 1-adamantaneacetic acid (Example 12, 1) as starting material.

(3) Preparation of 1-adamantaneacetamide is prepared similar to 1-adamantanecarboxamide (Example 12, 2), M.P. 166–168°.

(4) Preparation of 2 - (1 - adamantyl)ethylamine is made similar to 1-adamantylmethylmethylamine (Example 12, 3). It may be identified as its hydrochloride which separates as white crystals from methanol-ether, M.P. over 280°.

(5) Preparation of $N^1$-(1-adamantylethyl)sulfanilamide.—Following the procedure of Example 1, but substituting 1 - adamantylethylamine for the 1-aminoadamantane, there is obtained $N^1$-(1-adamantylethyl)sulfanilamide.

What is claimed is:
1. A compound of the formula

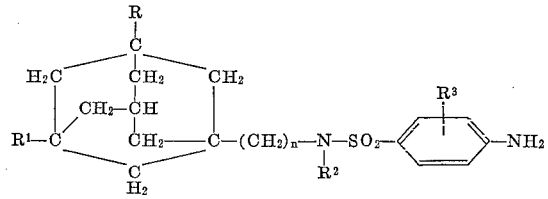

wherein R and $R^1$ each is hydrogen, halogen lower alkyl, phenyl or phenyl-lower alkyl, $R^2$ is hydrogen or lower alkyl, $R^3$ is hydrogen, lower alkyl, lower alkoxy, halogen or halo-lower alkyl and $n$ is 0, 1 or 2 and salts thereof.

2. A compound as in claim 1 wherein R, $R^1$, $R^2$ and $R^3$ all are hydrogen and $n$ is 0.
3. A compound as in claim 1 wherein R, $R^1$, $R^2$ and $R^3$ all are hydrogen and $n$ is 1.
4. A compound as in claim 1 wherein R, $R^1$, $R^2$ and $R^3$ all are hydrogen and $n$ is 2.
5. A compound as in claim 1 wherein R, $R^2$ and $R^3$ all are hydrogen, $R^1$ is methyl and $n$ is 0.
6. A compound as in claim 1 wherein R, $R^2$ and $R^3$ all are hydrogen, $R^2$ is methyl and $n$ is 0.
7. A compound as in claim 1 wherein R, $R^2$ and $R^3$ all are hydrogen, $R^1$ is ethyl and $n$ is 1.
8. A compound as in claim 1 wherein R, $R^2$ and $R^3$ all are hydrogen, $R^1$ is fluorine and $n$ is 1.
9. A compound as in claim 1 wherein R, $R^1$ and $R^2$ all are hydrogen, $R^3$ is trifluoromethyl and $n$ is 0.
10. A compound as in claim 1 wherein R and $R^1$ each is methyl, $R^2$ and $R^3$ each is hydrogen and $n$ is 1.

References Cited

UNITED STATES PATENTS 3,450,721   6/1969   Dietrich _____ 260—397.7

HENRY R. JILES, Primary Examiner

C. M. SHURKO, Assistant Examiner

U.S. Cl. X.R.

260—563, 543; 424—228